(12) United States Patent
Christenson

(10) Patent No.: US 11,934,819 B2
(45) Date of Patent: Mar. 19, 2024

(54) BARE-METAL DEPLOYMENT

(71) Applicant: Target Brands, Inc., Minneapolis, MN (US)

(72) Inventor: Mark Gregory Korent Christenson, Woodbury, MN (US)

(73) Assignee: Target Brands, Inc., Minneapolis, MN (US)

( * ) Notice: Subject to any disclaimer, the term of this patent is extended or adjusted under 35 U.S.C. 154(b) by 294 days.

(21) Appl. No.: 17/214,331

(22) Filed: Mar. 26, 2021

(65) Prior Publication Data
US 2022/0308854 A1 Sep. 29, 2022

(51) Int. Cl.
*G06F 9/44* (2018.01)
*G06F 3/06* (2006.01)
*G06F 8/61* (2018.01)

(52) U.S. Cl.
CPC .............. *G06F 8/63* (2013.01); *G06F 3/0604* (2013.01); *G06F 3/0644* (2013.01); *G06F 3/0679* (2013.01)

(58) Field of Classification Search
CPC .... G06F 3/0604; G06F 3/0644; G06F 3/0679; G06F 8/63
USPC ................................................ 717/174–178
See application file for complete search history.

(56) References Cited

U.S. PATENT DOCUMENTS

| | | | | |
|---|---|---|---|---|
| 7,694,165 B2* | 4/2010 | Sudhakar | ............ | G06F 11/1469 |
| | | | | 714/2 |
| 8,347,137 B1* | 1/2013 | Chepel | ................ | G06F 11/1417 |
| | | | | 714/6.12 |
| 8,819,660 B2 | 8/2014 | Fries et al. | | |
| 8,997,090 B2* | 3/2015 | Xu | ............................. | G06F 8/61 |
| | | | | 717/174 |
| 9,170,803 B2 | 10/2015 | Pavlik et al. | | |
| 9,459,858 B2 | 10/2016 | Mavinakayanahalli et al. | | |
| 9,697,130 B2* | 7/2017 | Karippara | ................. | G06F 9/50 |
| 9,772,928 B2 | 9/2017 | Bhandari et al. | | |
| 9,880,827 B2 | 1/2018 | Miller et al. | | |
| 10,146,552 B2 | 12/2018 | Chandrasekhar et al. | | |
| 10,310,863 B1 | 6/2019 | Poimboeuf et al. | | |

(Continued)

OTHER PUBLICATIONS

IBM, "SAN Boot Implementation and Best Practices Guide for IBM System Storage", 2012, International Business Machines Corporation, 478 pages (Year: 2012).*

(Continued)

*Primary Examiner* — Ted T. Vo
(74) *Attorney, Agent, or Firm* — Theodore M. Magee; Westman, Champlin & Koehler, P.A.

(57) ABSTRACT

A computer-implemented method is performed in a machine having at least one processor and storage. The at least one processor executes an agent and a host that are both stored in the storage. The at least one processor's execution of the agent causes the at least one processor to create a new partition of the storage while the at least one processor is executing the host. The at least one processor's execution of the agent causes the at least one processor to store a new operating system in the new partition of the storage while the at least one processor is executing the host. The at least one processor's execution of the agent causes the at least one processor to reboot the machine into the new partition to cause the at least one processor to execute the new operating system.

20 Claims, 10 Drawing Sheets

(56) References Cited

U.S. PATENT DOCUMENTS 10,360,020 B2    7/2019   Hirshberg
10,514,904 B2   12/2019  Saraswati et al.
10,649,763 B2    5/2020   Ramachandran et al.

OTHER PUBLICATIONS

Acronis, "Acronis True Image 2017", 2017, retrieved from https://dl.acronis.com/ 180 pages. (Year: 2017).*

Margaret Rouse, "Bare Metal", 2013, retrieved from https://www.techopedia.com/contributors/margaret-rouse, 2 pages. (Year: 2013).*

Gabriele Diener, "How to build a smaller Docker image", 2019, retrieved from https://medium.com/@gdiener/how-to-build-a-smaller-docker-image-76779e18d48a, 23 pages. (Year: 2019).*

Giuffrida et al., Safe and Automatic Live Update for Operating System, ACM Signplan Notices 48, No. 4, pp. 279-292, https://www.academia.edu/download/46532325/safe_and_automatic_live_update_for_opera20160616-12343-1y75hnd.pdf, 2013.

Potter et al., Reducing Downtime Due to System Maintenance and Upgrades, Proceedings of the 19th USENIX Systems Administration Conference, pp. 47-62, https://www.usenix.org/legacy/events/lisa05/tech/potter/potter.pdf, 2005.

Zellweger et al., Decoupling cores, kernels and operating systems, 11th USENIX Symposium of Operating Systems Design and Implementation (OSDI 14), pp. 17-31, https://www.usenix.org/system/files/conference/osdi14/osdi14-paper-zellweger.pdf, 2014.

* cited by examiner

BARE-METAL DEPLOYMENT

BACKGROUND

Bare-metal deployments involve installing a new operating system and one or more applications on a blank storage device. One technique for performing bare-metal deployments is to install and configure an operating system and any desired applications on a virtual machine. An image of the virtual machine is then captured and is copied to the blank storage device.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method is performed in a machine having at least one processor and storage. The at least one processor executes an agent and a host that are both stored in the storage. The at least one processor's execution of the agent causes the at least one processor to create a new partition of the storage while the at least one processor is executing the host. The at least one processor's execution of the agent causes the at least one processor to store a new operating system in the new partition of the storage while the at least one processor is executing the host. The at least one processor's execution of the agent causes the at least one processor to reboot the machine into the new partition to cause the at least one processor to execute the new operating system.

In accordance with a further embodiment, a machine includes a storage device having a storage capacity in which are stored instructions that implement an agent, instructions that implement a host and data representing a logical partition of the storage capacity. A processor in the machine executes the instructions that implement the host so as to execute workloads while in parallel executing the instructions that implement the agent to: create a new logical partition of the storage capacity; download and store an operating system in the new logical partition; and request permission to reboot the machine.

In accordance with a still further embodiment, a method includes retrieving a location of a software container having multiple layers, wherein the base layer of the software container is an operating system and writing the multiple layers of the software container as a single layer in a partition of a storage device on a machine to produce a bare-metal deployment on the storage device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the past, when a machine used in a computing cluster needed to have its operating system updated, the machine was taken out of the cluster, the existing operating system on the storage device was deleted and an image of the new operating system was copied onto the device. Applications and other utilities would then be downloaded onto the new operating system through a collection of additional steps. This required a significant amount of down time for the machine and required a significant amount of manual effort.

In accordance with the various embodiments, an agent is provided on a machine and executes in parallel with a host that performs jobs on behalf of a computing cluster. The agent periodically checks to ensure that the machine it is running on is in a desired state. When the agent determines that the machine's state does not match the desired state, the agent first determines what logical partitions the machine is supposed to have to match the desired state. The agent then deletes and/or creates logical partitions as needed to match the desired state. Once the logical partitions match, the agent determines if the software executing on the machine matches the desired state. If the software does not match, the agent locates an image of a software container having multiple layers representing an operating system, configuration steps and additional applications. The agent writes the contents of the image to a blank partition while flattening the software container so that all of the layers are represented by a single layer in the new partition. The agent then asks a platform agent for permission to reboot. The platform agent works with other platform agents to redirect workloads away from the host to other hosts in the cluster so that the agent's machine can be rebooted. When the platform agent grants the agent permission to reboot, the host on the machine is no longer processing any workloads and the agent reboots the machine into the new partition. The machine then begins executing the new operating system and applications including the agent.

Figure 1:
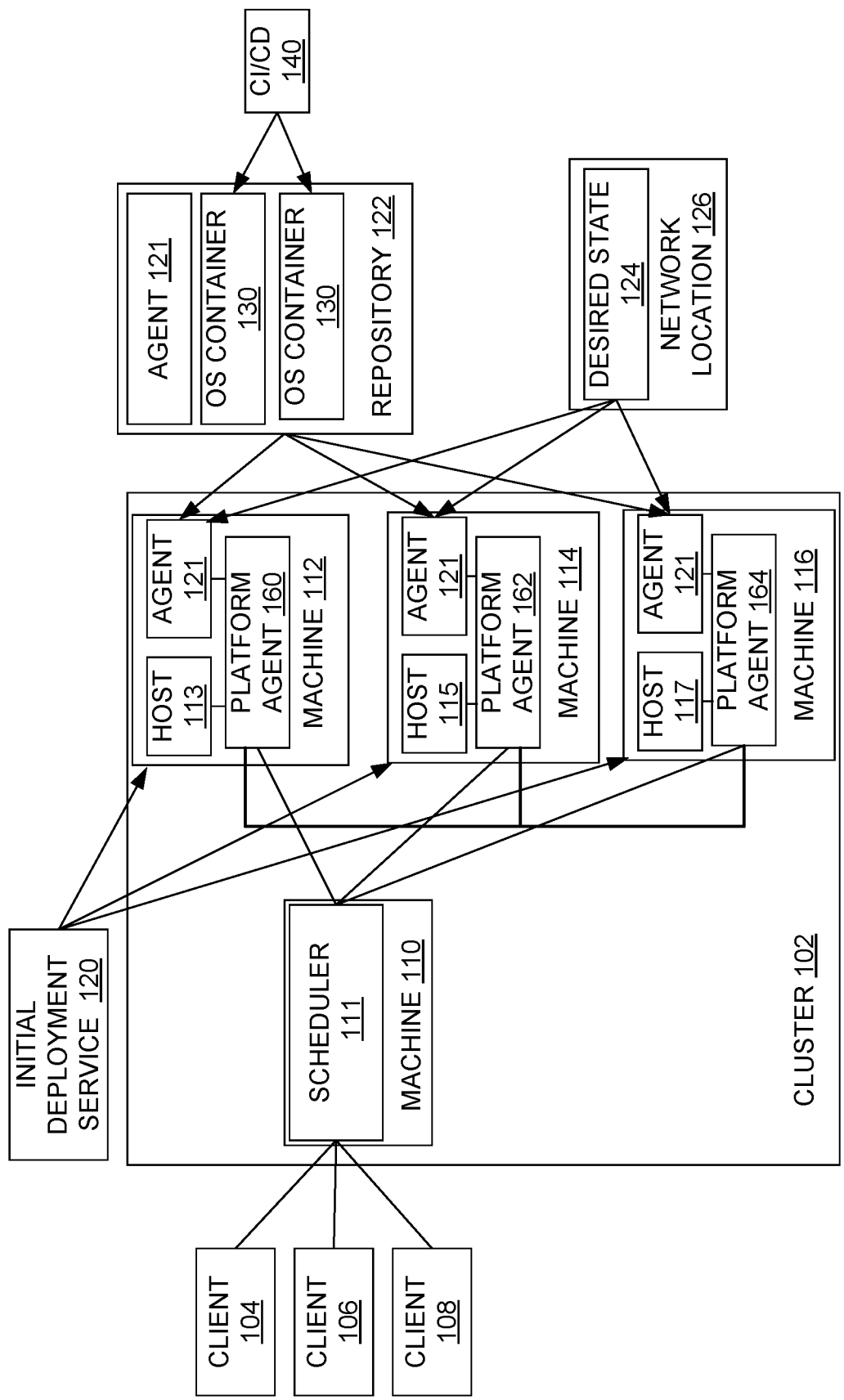
FIG. 1 is a block diagram of a network environment.

FIG. 1 provides a block diagram of an exemplary networking environment 100 in which embodiments described below are implemented. In networking environment 100, a cluster 102 of computing devices executes jobs in response to requests provided by a plurality of clients such as clients 104, 106 and 108. Cluster 102 includes a machine 110 executing a cluster scheduler 111, and a plurality of machines, such as machines 112, 114 and 116, each executing a respective platform agent 160, 162 and 164 and host 113, 115, and 117. Platform agents 160, 162 and 164 communicate with each other and cluster scheduler 111 to assign jobs to the hosts based on requests from clients 104, 106 and 108 to most efficiently complete the jobs.

Figure 2:
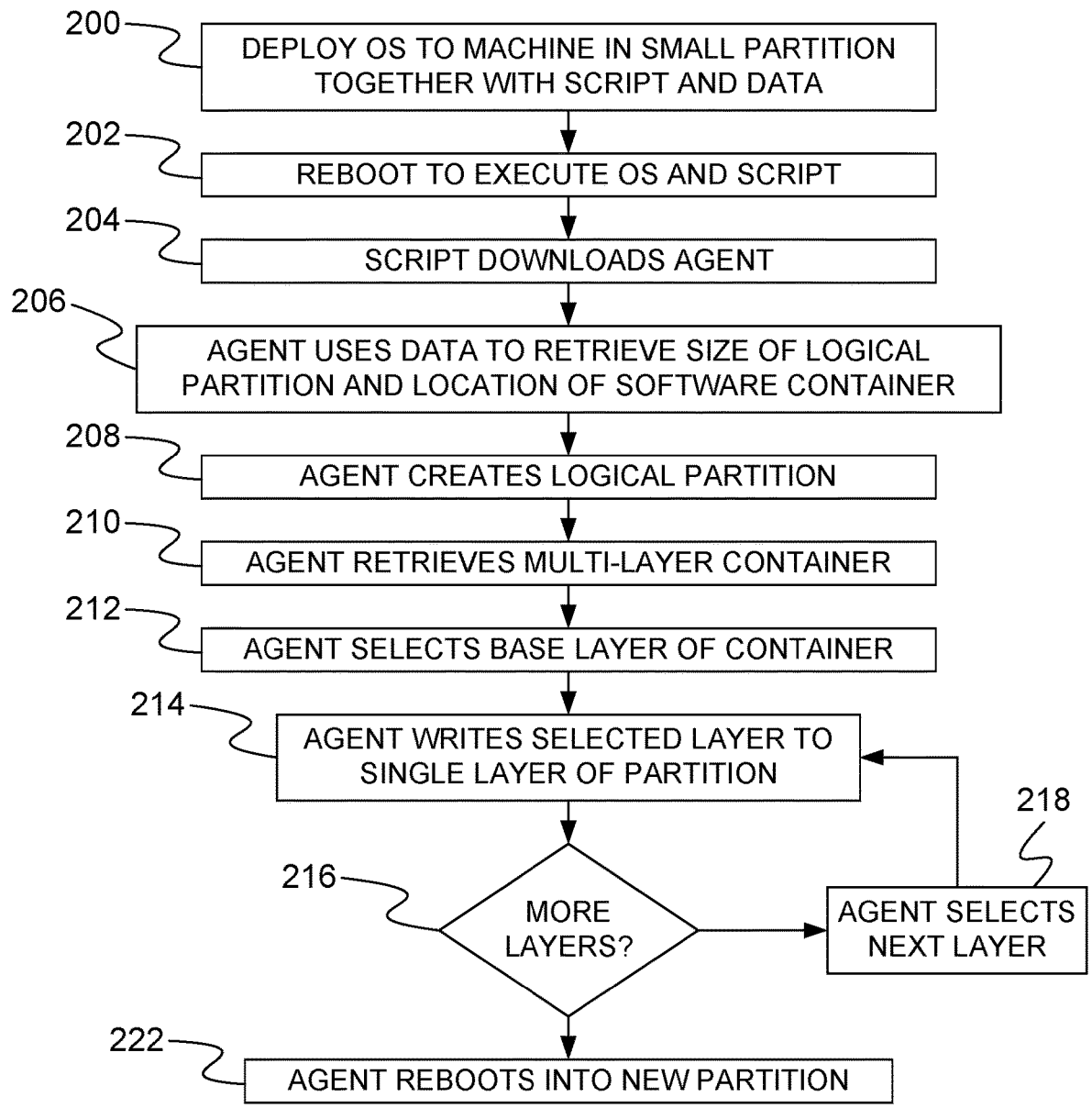
FIG. 2 is a flow diagram of a method of performing a bare-metal deployment on a machine that does not have an operating system.
Figure 4:
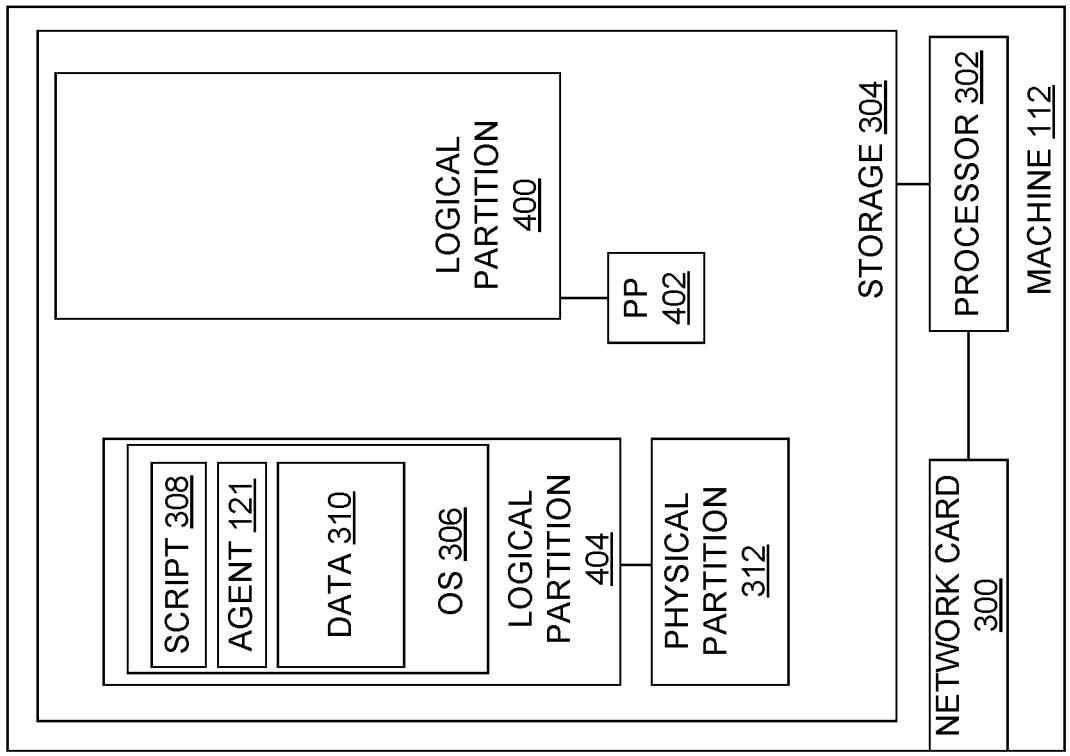
FIG. 4 is a depiction of an intermediate stage of a bare-metal deployment on a machine that does not have an operating system.
Figure 3:
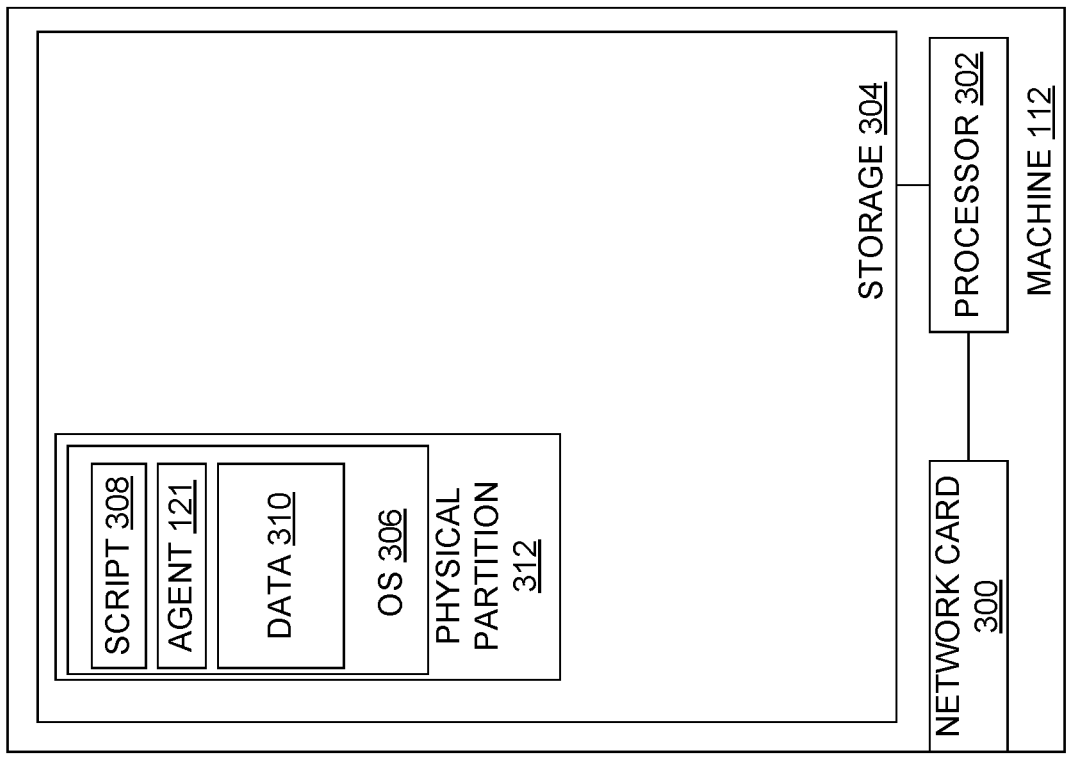
FIG. 3 is a depiction of an initial stage of a bare-metal deployment on a machine that does not have an operating system.

The embodiments described below provide techniques for performing bare-metal deployments on machines 112, 114 and 116 where a bare-metal deployment involves writing an operating system to a blank storage area. FIG. 2 below provides a flow diagram of an exemplary method for performing a bare-metal deployment when a machine does not have an existing operating system. In the description below, the method is discussed with reference to machine 112, but the same method is used with each the machines in the cluster.

FIGS. 3-6 depict changes to machine 112 during the process of FIG. 2. In FIGS. 3-6, machine 112 is depicted as including a network card 300, a processor 302 and a storage area 304. Although only a single network card and processor are shown, those skilled in the art will recognize that machine 112 can include multiple network cards and multiple processors. In addition, storage area 304 is constructed of one or more storage devices such as disc drives and solid-state drives that together provide the total storage capacity of machine 112. Processor 302 is a multi-threaded processor that is able to execute multiple threads of instruction in parallel by switching between threads before the threads complete their execution. For example, the processor will execute some instructions for one thread and then, before the thread has ended, switch to executing another thread for a time before continuing the execution of the first thread.

In step 200 of FIG. 2, a generic operating system 306, a script 308 and a small amount of data 310 are deployed to a physical partition 312 on machine 112 by an initial deployment service 120 (FIG. 1). At step 202, machine 112 is rebooted so that it begins to execute generic operating system 306 and then executes script 308. At step 204, script 308 causes processor 302 to download an agent 121 from a repository 122 through network card 300 and then start execution of agent 121. Agent 121 accesses a desired state 124 (FIG. 1) stored for machine 112 at a network location 126 at step 206. In accordance with one embodiment, the network location is stored in data 310 while in another embodiment, the network location is stored within agent 121.

Figure 10:
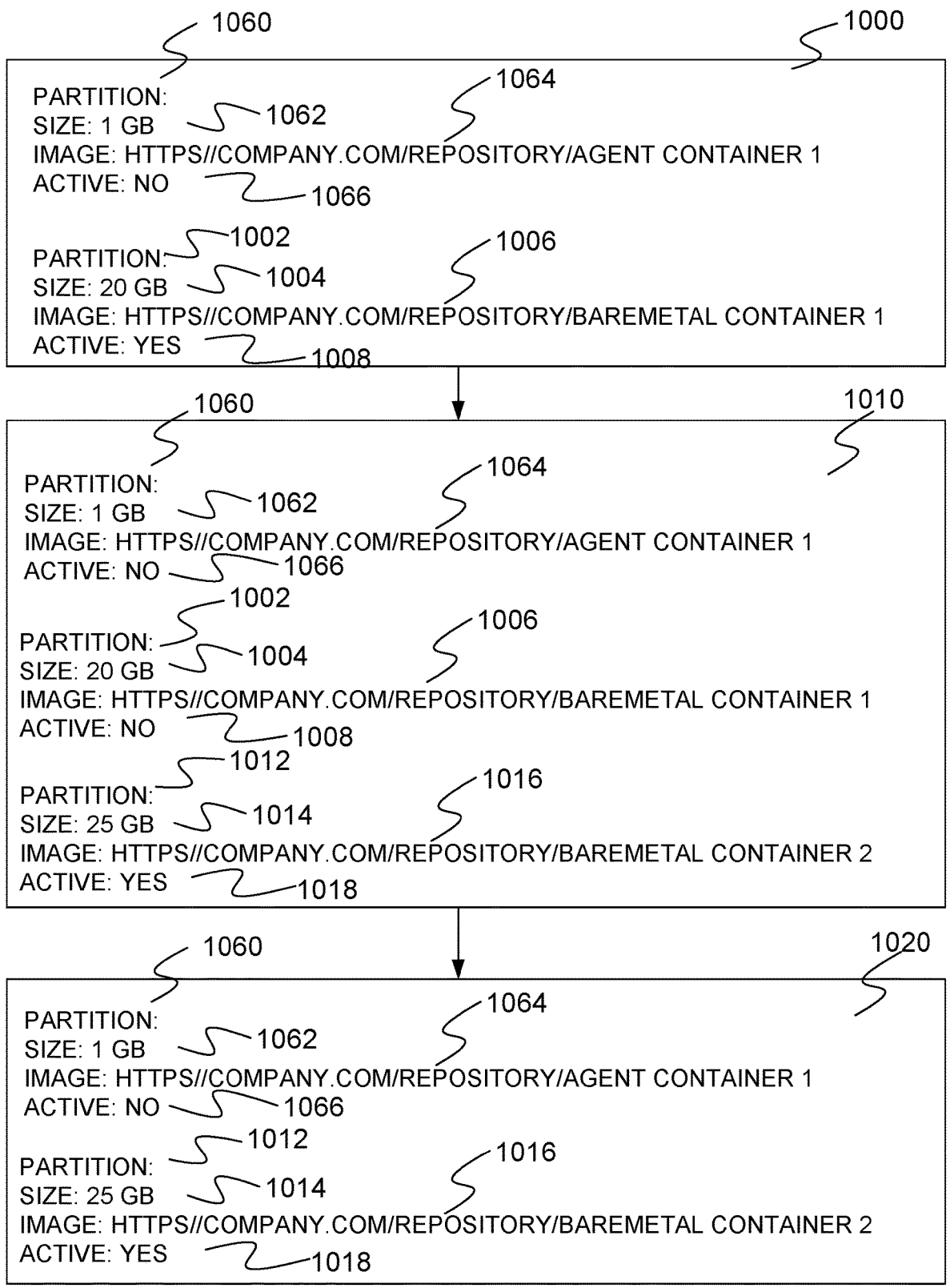
FIG. 10 provides a sequence of desired states for machines in a cluster.

The desired state for machine 112 includes information for each logical partition that the storage on the machine should be divided into. An example of desired state 124 is shown in FIG. 10 as initial desired state 1000. In initial desired state 1000, two partition definitions 1060 and 1002 are provided. Partition definition 1060 is for the partition that containing agent 121 and partition definition 1002 is for a partition that will contain a host. Partition definition 1060 includes a size 1062 for the partition, an image path 1064 that provides a network location for a container that provides an image of agent 121, and an indication 1066 that machine 112 is not to be executing the operating system on the partition. Partition definition 1002 includes a starting size 1004 for the partition, an image path 1006 that provides a network location for a software container that provides an image of an operating system, configuration steps and other applications that are to be stored in the partition, and an active indication 1008 that indicates whether machine 112 should be executing the operating system stored in the partition.

At step 208, agent 121 creates a logical partition 400 (FIG. 4), also referred to as a logical volume, and assigns one or more physical partitions 402 to logical partition 400 so that logical partition 400 has the starting size set in desired state 124. In addition, agent 121 creates a shared logical partition 404 for physical partition 312. In accordance with one embodiment, logical partition 400 is set for the partition in desired state 124 so that a thin physical partition 402 can initially be assigned to logical partition 400. As the storage needs of the host running in the partition increases, the size of logical partition 400 can be easily increased by assigning additional physical partitions to logical partition 400 as discussed further below.

At step 210, agent 121 on machine 112 retrieves the software container that is to be installed in the new partition by using the network location set in desired state 124. In FIG. 1, the software container is shown as operating system container 130, which is stored in repository 122. In accordance with one embodiment, the software container is constructed of layers, where each layer is a collection of file changes (adding a file, replacing a file, deleting a file) associated with constructing the container. Typically, the first layer consists of files that provide a generic operating system. Successive layers add additional files, replace files that were previously added or delete files that were previously added.

Figure 5:
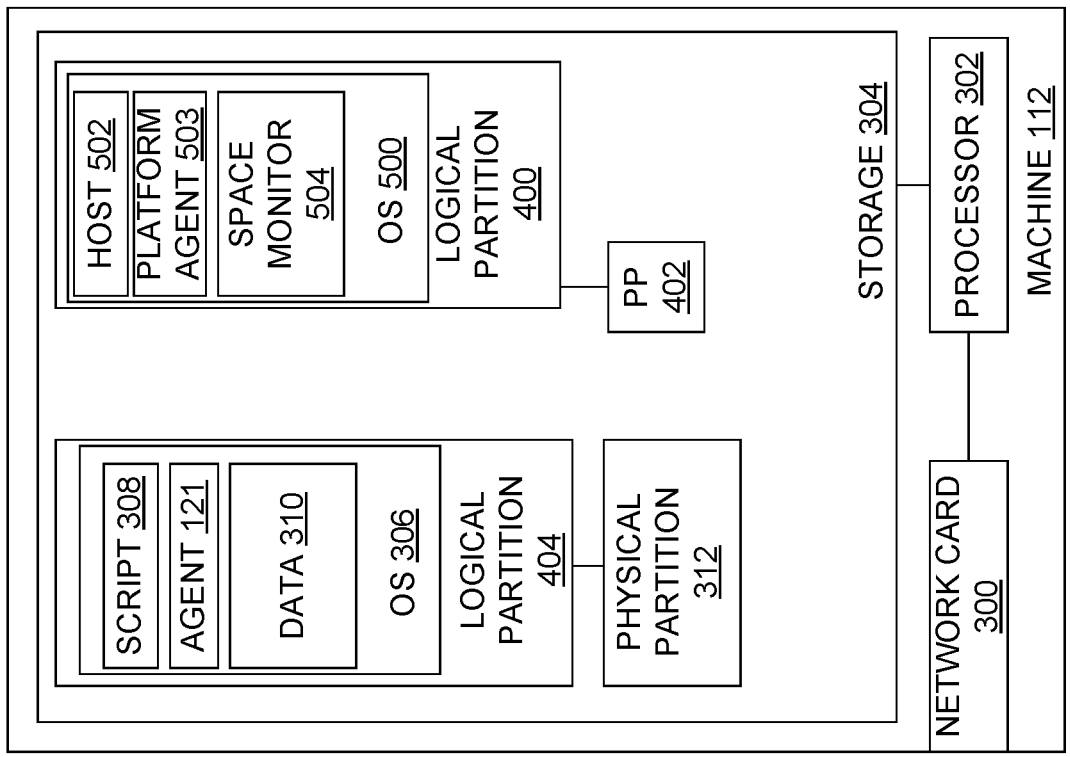
FIG. 5 is a depiction of a further intermediate stage of a bare-metal deployment on a machine that does not have an operating system.
Figure 11:
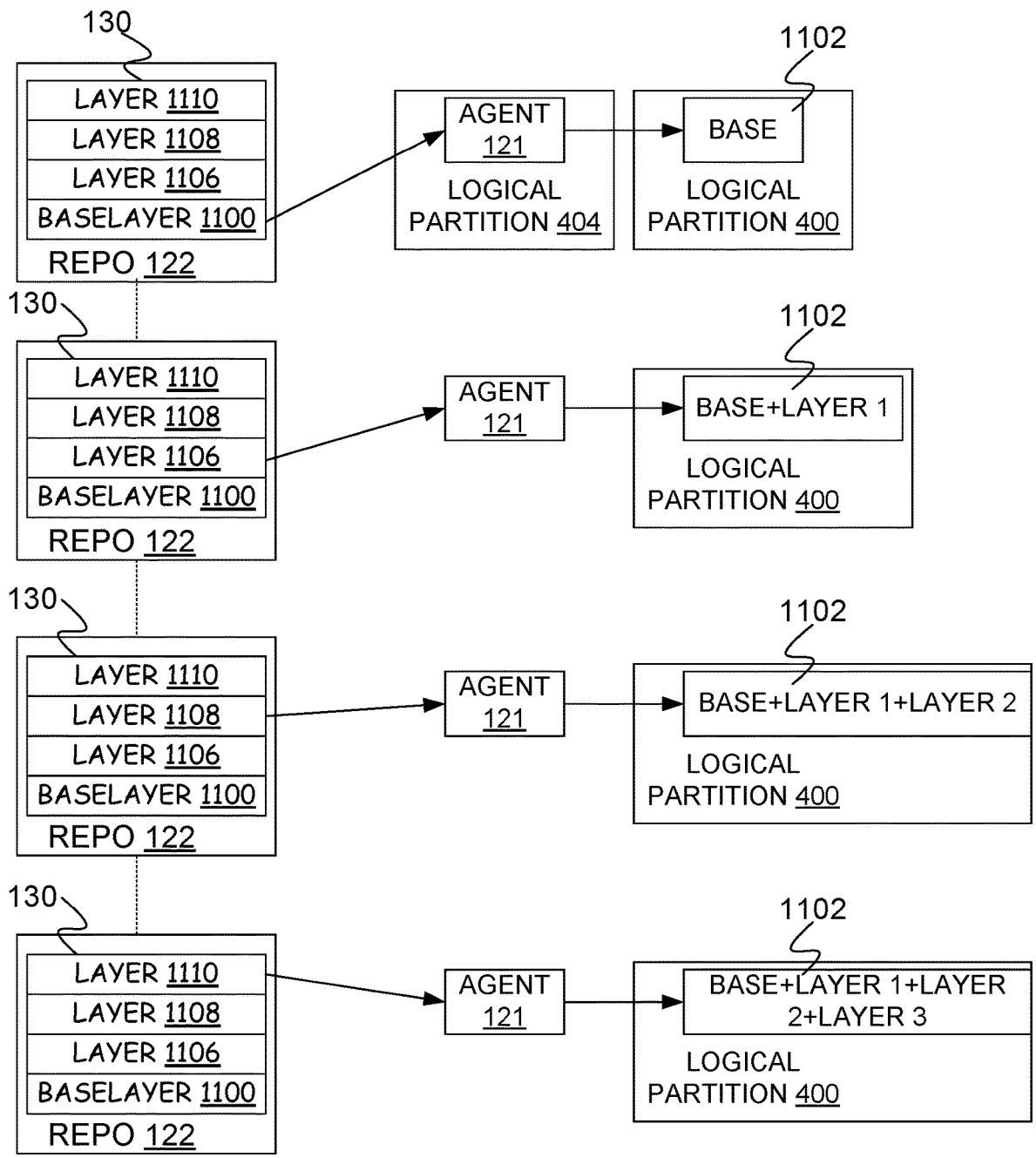
FIG. 11 depicts a sequence of operations for flattening a container image into a logical partition.

Instead of copying the multi-layered image of operating system container 130 directly into logical partition 400, agent 121 transforms the multiple layers of the container into a single layer in logical partition 400. FIG. 11 provides a depiction of this flattening process, which begins at step 212 of FIG. 2 where a base layer 1100 of operating system container 130 is selected by agent 121. At step 214, agent 121 writes the selected layer to logical partition 400 as single layer 1102. At step 216, agent 121 determines if there are more layers in operating system container 130. If there are more layers, the next layer up, layer 1106 in FIG. 11, is selected at step 218 and the process returns to step 212 to write the selected layer to single layer 1102. This involves adding new files of the selected layer to single layer 1102, replacing files in single layer 1102 with files having the same filename in the selected layer, and deleting files from single layer 1102 when the selected layer indicates that the files are to be deleted. Steps 214, 216 and 218 are repeated until all of the layers of container 130, such as layers 1108 and 1110, are processed to form a final configuration of the operating system and additional applications in single layer 1102. The result of this flattening is shown in FIG. 5 where an operating system 500, a host 502 and a platform agent 503 have been written to logical partition 400.

When all of the layers of operating system container 130 have been processed at step 216, agent 121 reboots machine 112 into partition 400 at step 222 so that machine 112 begins executing operating system 500, host 502 and platform agent 503 and so that shared logical partition 400 appears as an accessible storage area to operating system 500. As part of the reboot process, agent 121 is loaded into random access memory from shared logical partition 404 and is executed by machine 112. In some embodiments, shared logical partition 404 also includes common configuration files for the machine and logging information. In some embodiments, instead of loading agent 121 from shared logical partition 404, a new copy of agent 121 is written into partition 400 as part of the container image and the new copy of agent 121 is loaded into random access memory.

Figure 6:
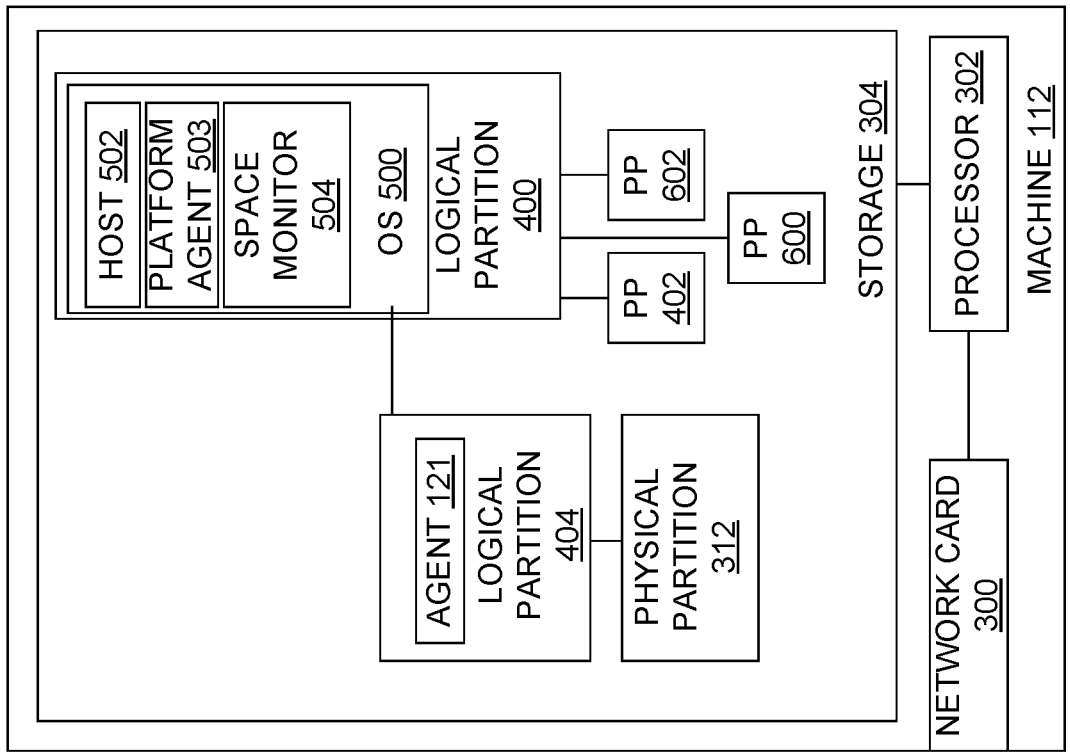
FIG. 6 is a depiction of an end stage of a bare-metal deployment on a machine that does not have an operating system.

As host 502 executes, it may need additional storage space. In accordance with one embodiment, a space monitor 504 is provided in the container that monitors the amount of available storage space in logical partition 400. When the available space drops below a threshold, space monitor 504 assigns an additional physical partition to logical partition 400. As shown in FIG. 6, this monitoring and expanding has resulted in additional physical partitions 600 and 602 being assigned to logical partition 400.

Developers wishing to change the operating system used by the machines in cluster 102, can use a Continuous Integration/Continuous Deployment (CI/CD) system 140 of FIG. 1. Using such systems, the operating system and/or the host can be altered and the resulting environment can be tested before publishing the container image. When the image is ready to be published, security checks that are applied to other software produced using CI/CD system 140 are applied to the container image to detect any security or coding flaws in the image. If the image passes the security checks, the container image is published to repository 122.

After a new container image is published to repository 122, desired state 124 for machines in the cluster is updated to indicate that a new container image should be active on the machines. FIG. 10 shows a new desired state configuration 1010 for desired state 124 that includes the partition definitions 1002 and 1060 from initial desired state configuration 1000 and a new partition definition 1012. Although partition definition 1002 is present in new desired state configuration 1010, its active indication 1008 has changed from "yes" to "no" to indicate that the machines in the cluster should no longer be running the image set in partition definition 1002. Partition definition 1012 includes a starting size 1014 for the partition, an image path 1016 that provides a network location for a software container that provides an image of an operating system, configuration steps and other applications that are to be stored in the partition, and an active indication 1018 that indicates that machines in the cluster should be executing the operating system stored in new partition.

Figure 8:
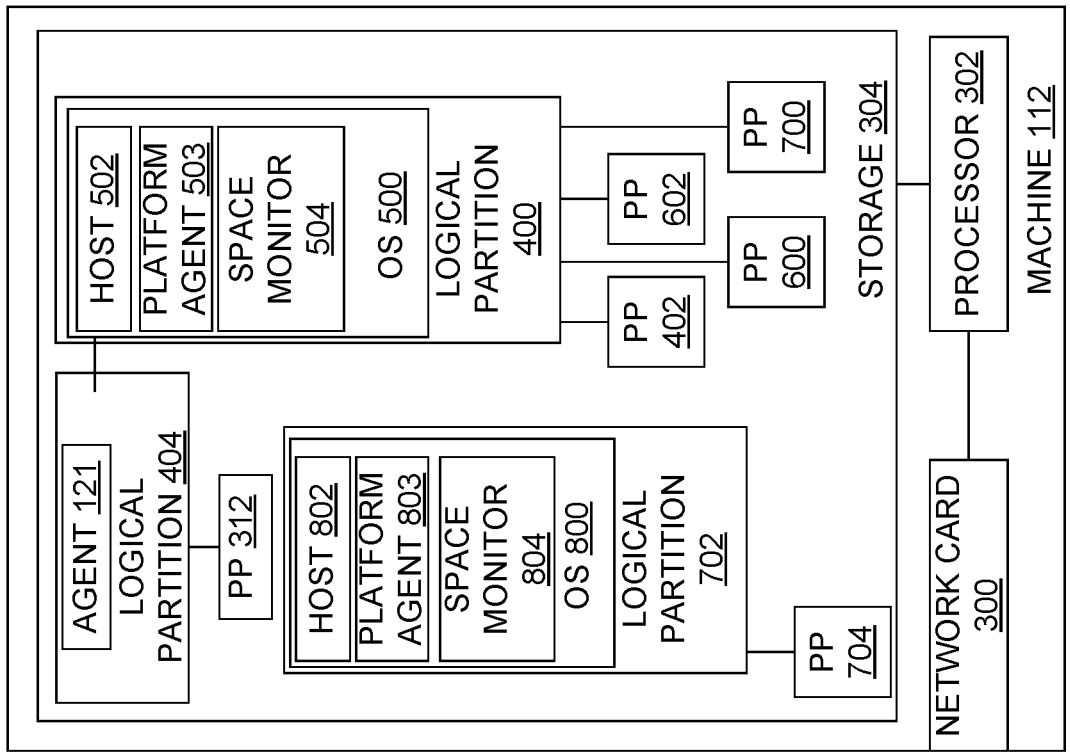
FIG. 8 is a depiction of an intermediate stage of a bare-metal deployment on a machine that is executing a host in a logical partition.
Figure 7:
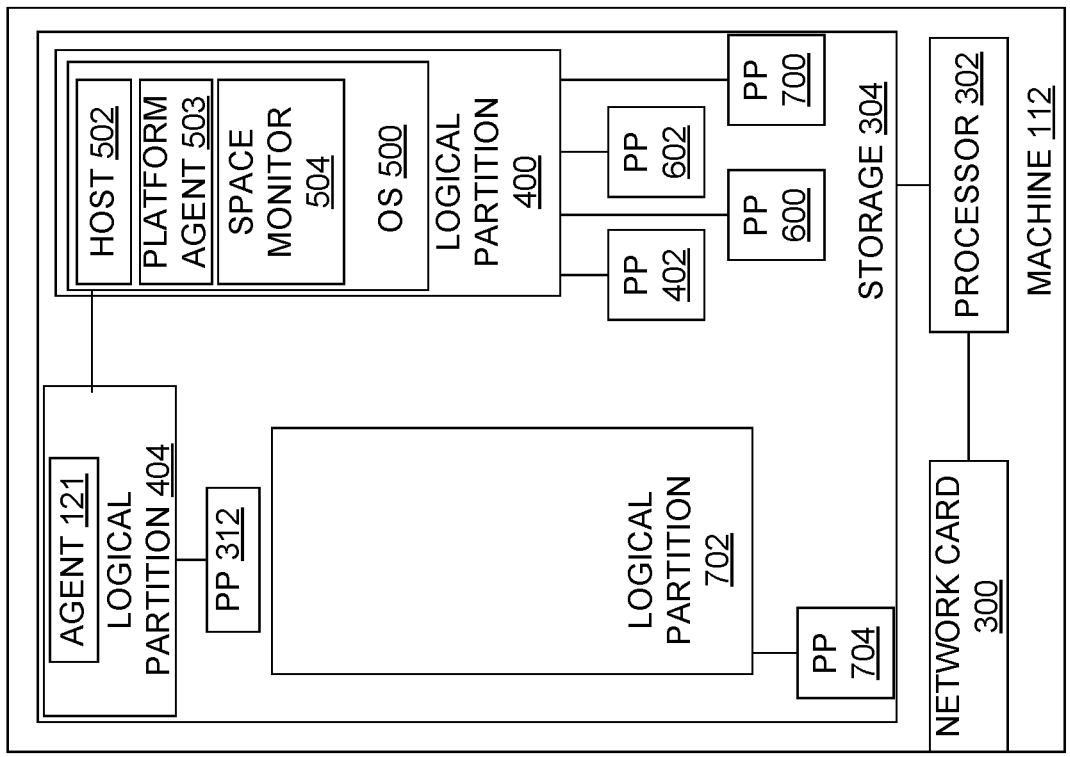
FIG. 7 is a depiction of an initial stage of a bare-metal deployment on a machine that is executing a host in a logical partition.
Figure 9:
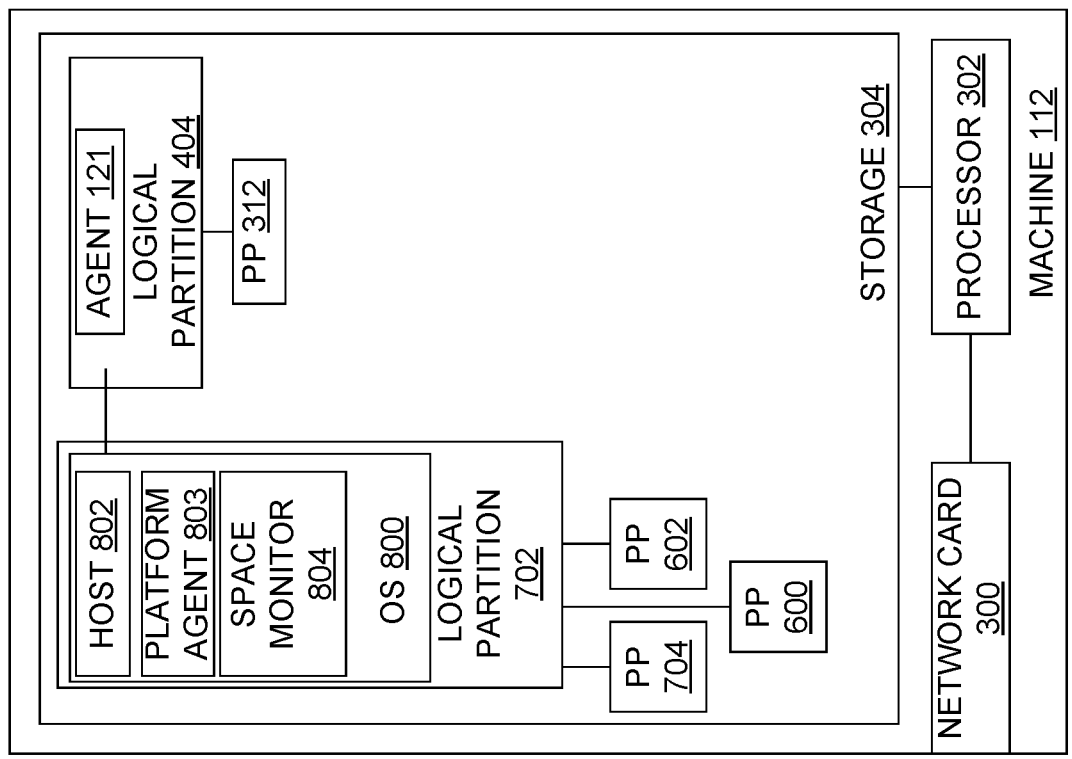
FIG. 9 is a depiction of an end stage of a bare-metal deployment on a machine that is executing a host in a logical partition.
Figure 12:
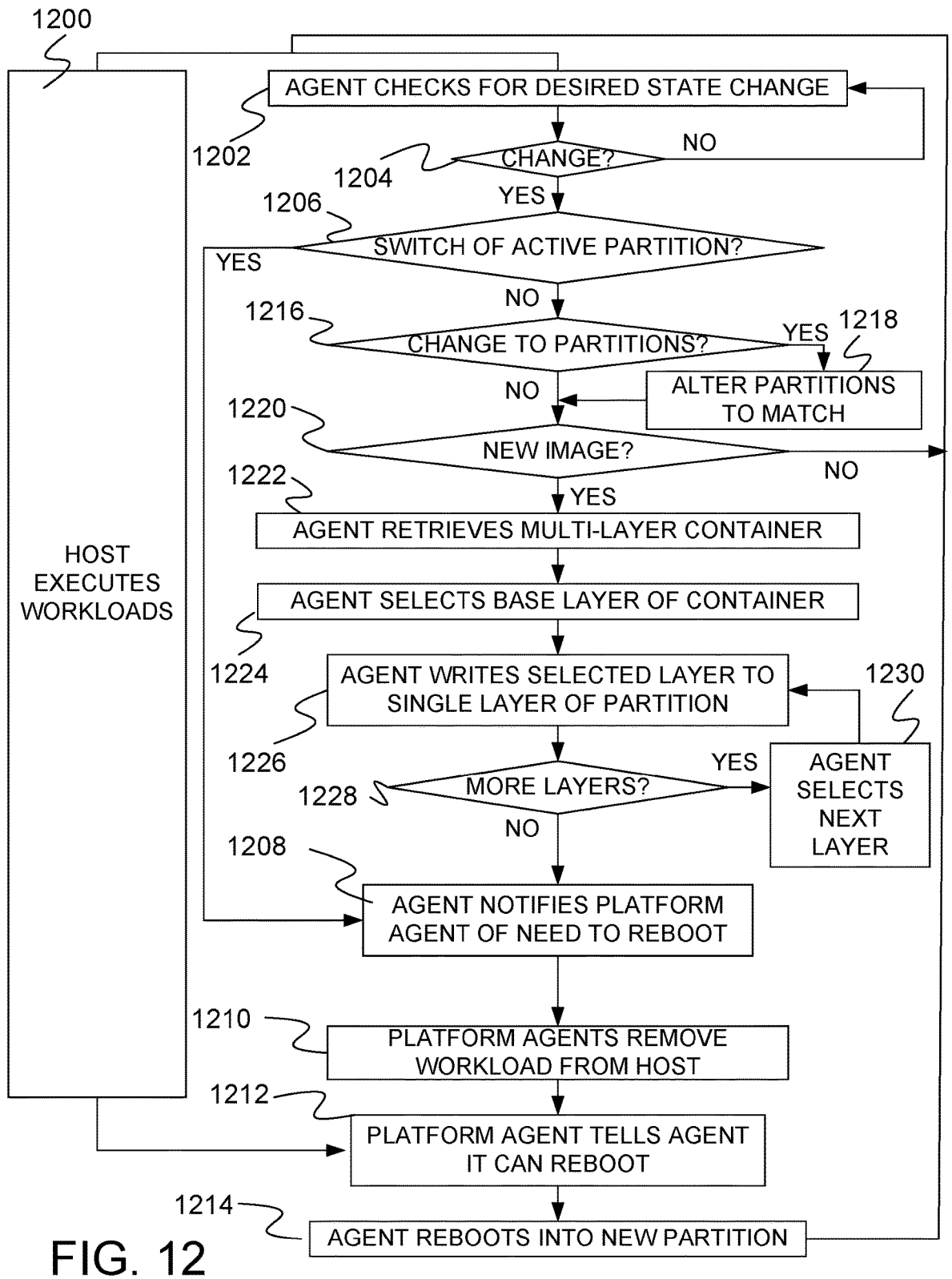
FIG. 12 is a flow diagram of a method for altering a machine based on changes to the desired state for the machine.

FIG. 12 provides a flow diagram of a method for implementing a bare-metal deployment on a machine that is currently executing a host. In the past, such deployments required that the host be removed from the cluster, the storage area of the machine be erased and an image of the new operating system and applications files be written to the storage area. This resulted in the host being offline for a significant period of time and negatively impacted the performance of the cluster. FIGS. 7-9 depict changes in machine 112 during the process of FIG. 12.

In FIG. 12, while processor 302 is executing jobs using host 502 as shown by step 1200, processor 300 is also executing agent 121 in parallel with host 502. At step 1202, agent 121 periodically checks desired state 124 to determine if it has changed. If desired state 124 has not changed at step 1204, agent 121 returns to step 1202.

When desired state 124 has changed at step 1204, agent 121 examines the changes at step 1206 to determine if they only involve switching which partition is currently active. Because the embodiments allow two different operating systems to be present on two different partitions at the same time, it is possible to quickly switch between operating systems simply by changing which partition is designated as active in desired state 124. This is especially helpful when bringing a new operating system or host online. If the new operating system or new host begins to fail, the machines in the cluster can be reverted back to the old operating system/old host without requiring anything additional to be downloaded to the machines. In the past, since the old operating system/old host were deleted during the bare-metal deployment, it was necessary to download the old operating system/old host in order to revert back to those older systems.

If agent 121 determines that the only change in desired state 124 is a switching of which partition is active, agent 121 notifies platform agent 503 that it needs to reboot machine 112 at step 1208. Platform agent 503 coordinates with other platform agents to remove the workload from host 502 on machine 112 as shown by step 1210. As a result, host 502 stops executing workloads as shown by the end of step 1200. Note that because respective instances of agent 121 are operating on multiple machines in the cluster, it is common for multiple instances of agent 121 to request to reboot their respective machines at the same time. Platform agents 503 must sequence the timing of when the multiple machines reboot so that the workload continues to be processed. In other words, platform agents 503 preferably do not reboot all of the machines in a cluster at the same time.

When host 502 is no longer executing a workload at step 1200, platform agent 503 notifies agent 121 that it is permitted to reboot machine 112 at step 1212. Agent 121 then reboots machine 121 into the partition designated as being active in desired state 124 at step 1214. Upon rebooting, machine 112 begins executing the operating system, host and platform agent in the active partition and shared logical partition 400 appears as an accessible storage area to the operating system. As part of the reboot process, agent 121 is loaded into random access memory from shared logical partition 404 and is executed by machine 112. The process of FIG. 12 then returns to steps 1200 and 1202 where the host of the newly active partition begins executing workloads and agent 121 resumes checking for changes in desired state 124.

If the change in desired state 124 does not involve just switching which partition is active at step 1206, agent 121 determines if the change in desired state 124 involves a change in the logical partitions on machine 112. For example, in FIG. 10, desired state 124 has changed from initial desired state 1000 to new desired state 1010. This change includes a change to the logical partitions in the form of a new logical partition 1012. Thus, at step 1216, agent 121 determines that there has been a change in the logical partitions of the desired state. In response, agent 121 alters the logical partitions to match the logical partitions of desired state 1010 at step 1218. This can involve adding a new logical partition that was not present in the earlier desired state. It can also involve removing a logical partition that was present in the earlier desired state but is not listed in the new desired state. By removing such logical partitions, the physical partitions that had been assigned to those logical partitions are freed to be used by the remaining logical partitions on machine 112. Note that during step 1218, agent 121 does not reduce the size of any logical partitions back to their starting size. Thus, if the size of a logical partition has been increased in order to accommodate the needs of the host operating in the partition, the logical partition is left at that new size and is not reverted back to its starting size.

FIG. 7 shows the change in machine 112 after step 1218. In FIG. 7, space monitor 504 has added an additional physical partition 700 to logical partition 400. Physical partition 700 was assigned before agent 121 detected a change in desired state 124 as part of the normal space maintenance of machine 112. During step 1218, logical partition 702 was created and a physical partition 704 was assigned to logical partition 702 to provide the starting size designated for the new logical partition in desired state 124. Note that physical partitions 402, 600, 602 and 700 continue to be assigned to logical partition 400 even though only physical partition 402 is needed to provide the starting size for logical partition 400.

After the logical partitions have been altered to match the new desired state at step 1218 or if the logical partitions did not change in the new desired state at step 1216, agent 121 determines if the change in the desired state requires a new image to be downloaded at step 1220. If the change in the desired state does not require a new image to be downloaded, agent 121 returns to step 1202 where it periodically checks for a new desired state.

When the change to the desired state does require a new image to be downloaded at step 1220, agent 121 retrieves the new operating system container image 131 from repository 120 at step 1222 using the path provided in desired state 124. For example, path 1016 of FIG. 10 would be used to retrieve operating system container image 131.

Figure 13:
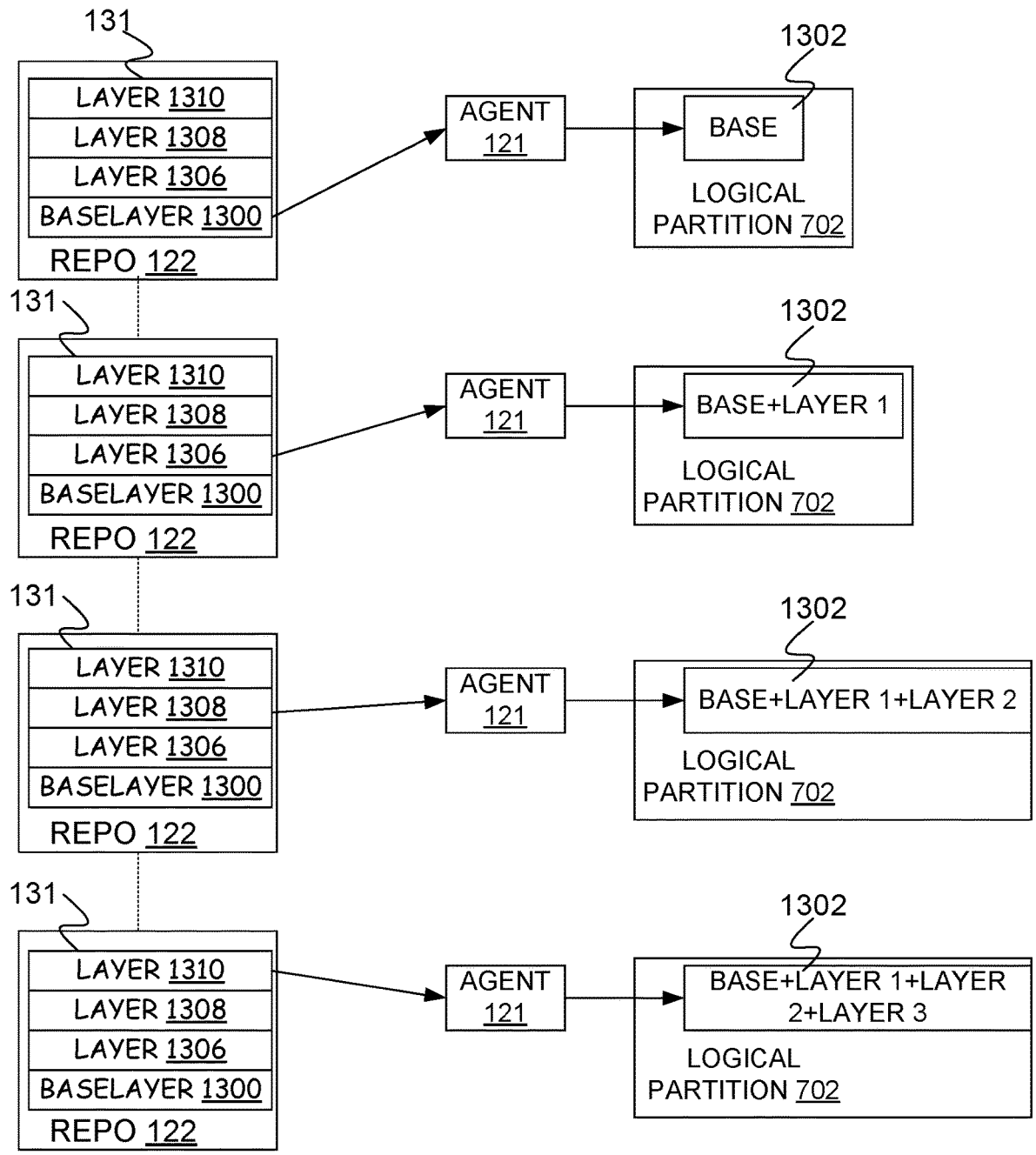
FIG. 13 depicts a sequence of operations for flattening a container image into a logical partition.

Instead of copying the multi-layered image of operating system container 131 directly into logical partition 702, agent 121 transforms the multiple layers of the container into a single layer in logical partition 702. FIG. 13 provides a depiction of this flattening process, which begins at step 1224 where a base layer 1300 of operating system container 131 is selected by agent 121. At step 1226, agent 121 writes the selected layer to logical partition 702 as single layer 1302. At step 1228, agent 121 determines if there are more layers in operating system container 131. If there are more layers, the next layer up, layer 1306 in FIG. 13, is selected at step 1230 and the process returns to step 1226 to write the selected layer to single layer 1302. Steps 1226, and 1228, 1230 are repeated until all of the layers of container 131, such as layers 1308 and 1310, are processed to form a final configuration of the operating system and additional applications in single layer 1302. The result of this flattening is shown in FIG. 8 where an operating system 800, a host 802, a platform agent 803 and a space monitor 804 have been written to logical partition 702.

After the image has been written to logical partition 702, agent 121 of partition 400 notifies platform agent 503 that it needs to reboot machine 112 at step 1208. Platform agent 503 coordinates with other platform agents to remove the workload from host 502 on machine 112 as shown by step 1210. As a result, host 502 stops executing workloads as shown by the end of step 1200. When host 502 is no longer executing a workload at step 1200, platform agent 503 notifies agent 121 that it is permitted to reboot machine 112 at step 1212. Agent 121 then reboots machine 121 into partition 702, which is designated as being active in desired state 124 at step 1214. Upon rebooting, machine 112 begins executing operating system 500, host 502 and platform agent 503 and shared logical partition 400 appears as an accessible storage area to operating system 500. As part of the reboot process, agent 121 is loaded into random access memory from shared logical partition 404 and is executed by machine 112.

The process of FIG. 12 then returns to steps 1200 and 1202 where host 802 of partition 702 begins executing workloads and agent 121 begins checking for changes in desired state 124.

Some time after host 802 begins executing, desired state 124 is changed to form new desired state 1020 of FIG. 10. In new desired state 1020, partition entry 1002 has been removed leaving only partition entry 1012. This change in the logical partitions is detected by agent 121 in step 1216. Since partition entry 1002 corresponds to logical partition 400 on machine 112, agent 121 removes logical partition 400 from machine 112 at step 1218. The results after step 1218 was performed are shown in FIG. 9 where logical partition 400 has been removed and physical partitions 402, 600, 602 and 700 have been freed for use by other logical partitions on machine 121. In FIG. 9, space monitor 804 has assigned freed physical partitions 600 and 602 to logical partition 702 as part of the normal space maintenance performed by space monitor 804. Thus, some of the physical partitions that had been assigned to logical partition 400 have been reassigned to logical partition 702.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
in a machine having at least one processor and storage, the at least one processor executing an agent and host that are both stored in the storage;
the at least one processor's execution of the agent causing the at least one processor to periodically retrieve a desired state for the storage and based on the retrieved desired state, create a new partition of the storage while the at least one processor is executing the host;
the at least one processor's execution of the agent causing the at least one processor to store a new operating system in the new partition of the storage while the at least one processor is executing the host; and
the at least one processor's execution of the agent causing the at least one processor to reboot the machine into the new partition to cause the at least one processor to execute the new operating system.

2. The computer-implemented method of claim 1 wherein causing the at least one processor to store the new operating system comprises:
causing the at least one processor to download a software container having multiple layers and store the multiple layers as a single layer containing the new operating system.

3. The computer-implemented method of claim 1 wherein upon rebooting of the machine, the at least one processor begins executing the agent.

4. The computer-implemented method of claim 1 further comprising the at least one processor's execution of the agent causing the at least one processor to remove the current partition.

5. The computer-implemented method of claim 4 further comprising the at least one processor's execution of the agent causing the at least one processor to retrieve a desired state for the machine and to use the desired state to determine that the current partition should be removed before removing the current partition.

6. The computer-implemented method of claim 1 further comprising the execution of the agent causing the at least one processor to send a request to a platform agent for permission to reboot while the at least one processor is executing the host.

7. The computer-implemented method of claim 6 further comprising the execution of the agent causing the at least one processor to wait to reboot until receiving permission from the platform agent to reboot while the at least one processor is executing the host.

8. A machine comprising:
a storage device having a storage capacity in which are stored instructions that implement an agent, instructions that implement a host and data representing a logical partition of the storage capacity; and
a processor executing the instructions that implement the host so as to execute workloads while in parallel executing the instructions that implement the agent to:
periodically retrieve a desired state for the storage capacity; and
based on the retrieved desired state:
create a new logical partition of the storage capacity;
download and store an operating system in the new logical partition; and
request permission to reboot the machine.

9. The machine of claim 8 further comprising the processor executing the instructions that implement the agent to reboot the machine into the new logical partition.

10. The machine of claim 8 wherein downloading and storing the operating system in the new logical partition comprises retrieving an image of a container having multiple layers and writing the multiple layers as a single layer in the new logical partition.

11. The machine of claim 9 wherein after rebooting, the processor executes the instructions that implement the agent.

12. The machine of claim 11 wherein after the reboot, the processor executes the instructions that implement the agent to delete the logical partition.

13. The machine of claim 12 wherein the processor deletes the logical partition by:
as part of periodically retrieving the desired state for the storage capacity, retrieving a new desired state for the storage capacity; and
determining that the new desired state does not include the logical partition.

14. The machine of claim 13 wherein the processor executing the instructions that implement the agent further downloads instructions to implement a new host in the single layer in the new logical partition.

15. The machine of claim 14 wherein the processor deletes the logical partition while in parallel executing workloads by executing the instructions that implement the new host.

16. A method comprising:
periodically retrieving desired states for a storage device; and
based on one of the retrieved desired states:
retrieving a location of a software container having multiple layers, wherein a base layer of the software container is an operating system; and
writing the multiple layers of the software container as a single layer in a partition of a storage device on a machine to produce a bare-metal deployment on the storage device.

17. The method of claim 16 wherein the steps of retrieving and writing are performed by a processor on the machine while a processor on the machine executes workloads as part of a cluster.

18. The method of claim 17 wherein the processor further creates the partition of the storage device while the processor executes workloads as part of the cluster.

19. The method of claim 18 wherein the processor executes the workloads as part of the cluster by executing instructions implementing a host that are stored in a second partition of the storage device.

20. The method of claim 19 further comprising rebooting the machine into the partition of the storage device and then deleting the second partition of the storage device.

* * * * *